United States Patent Office 2,762,716
Patented Sept. 11, 1956

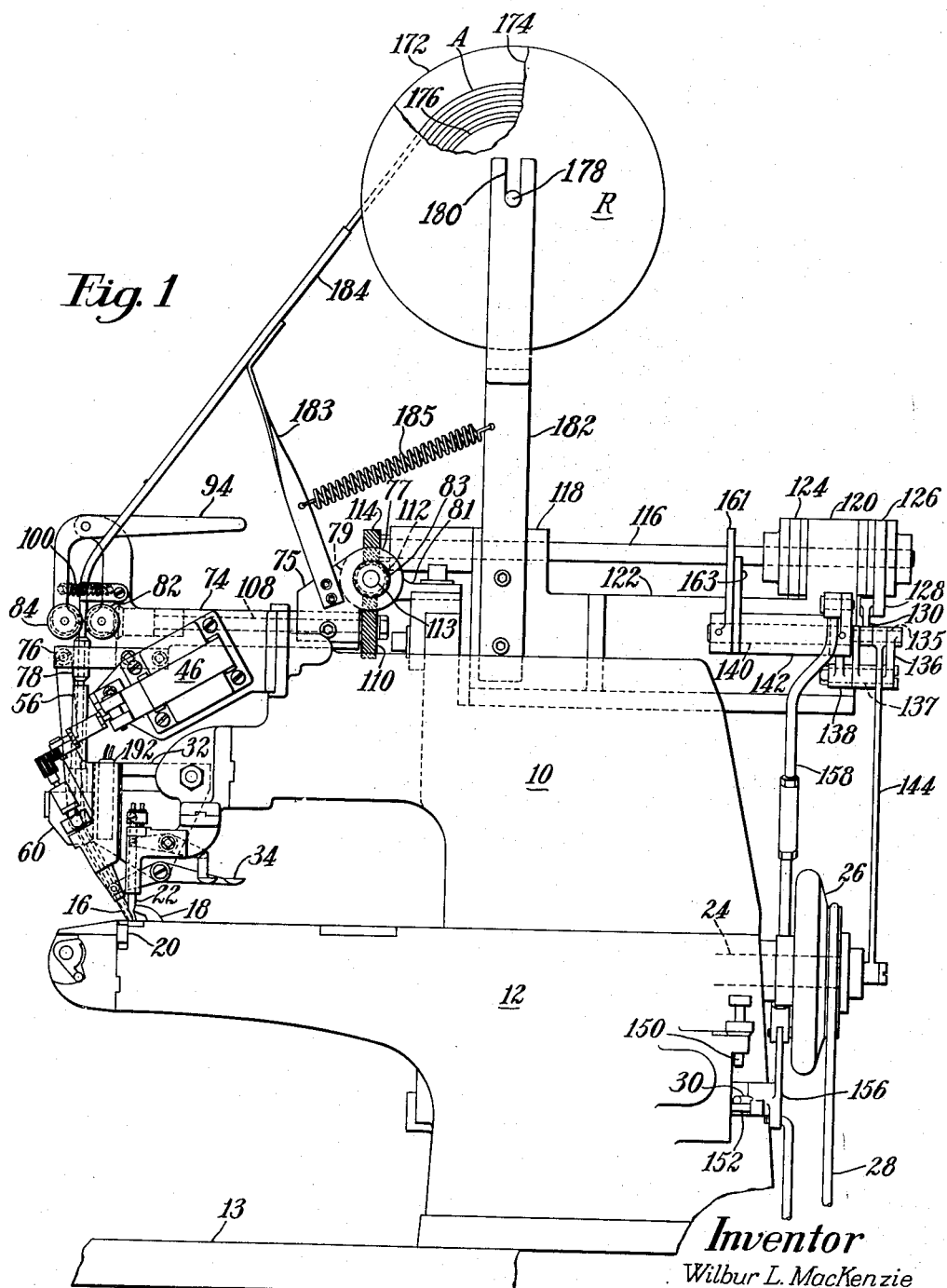

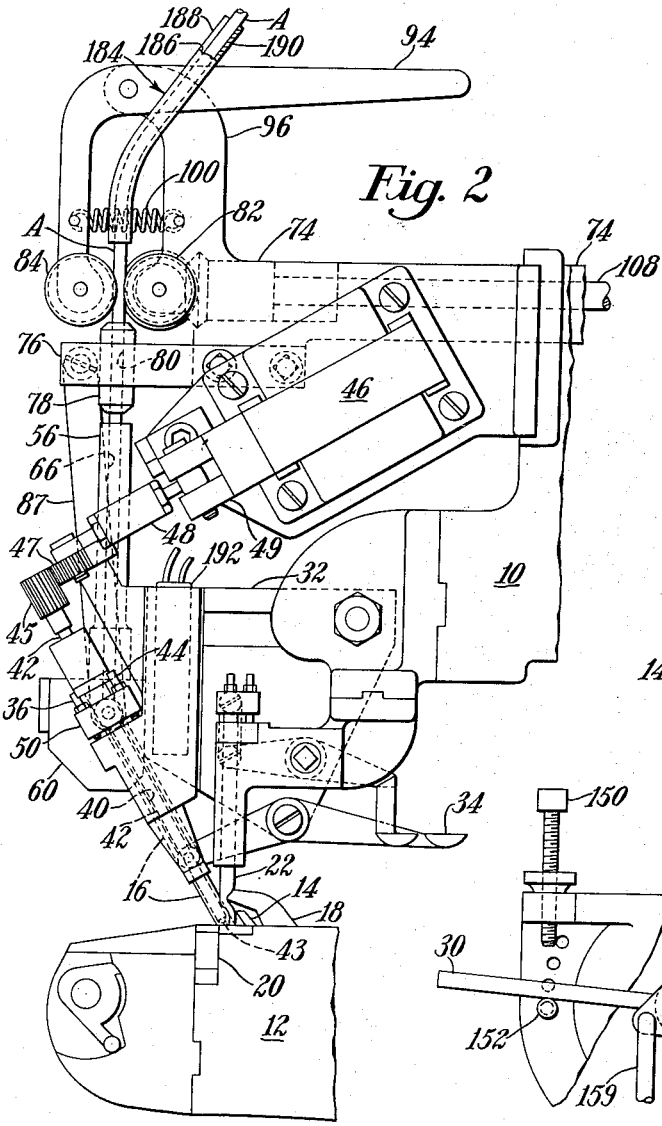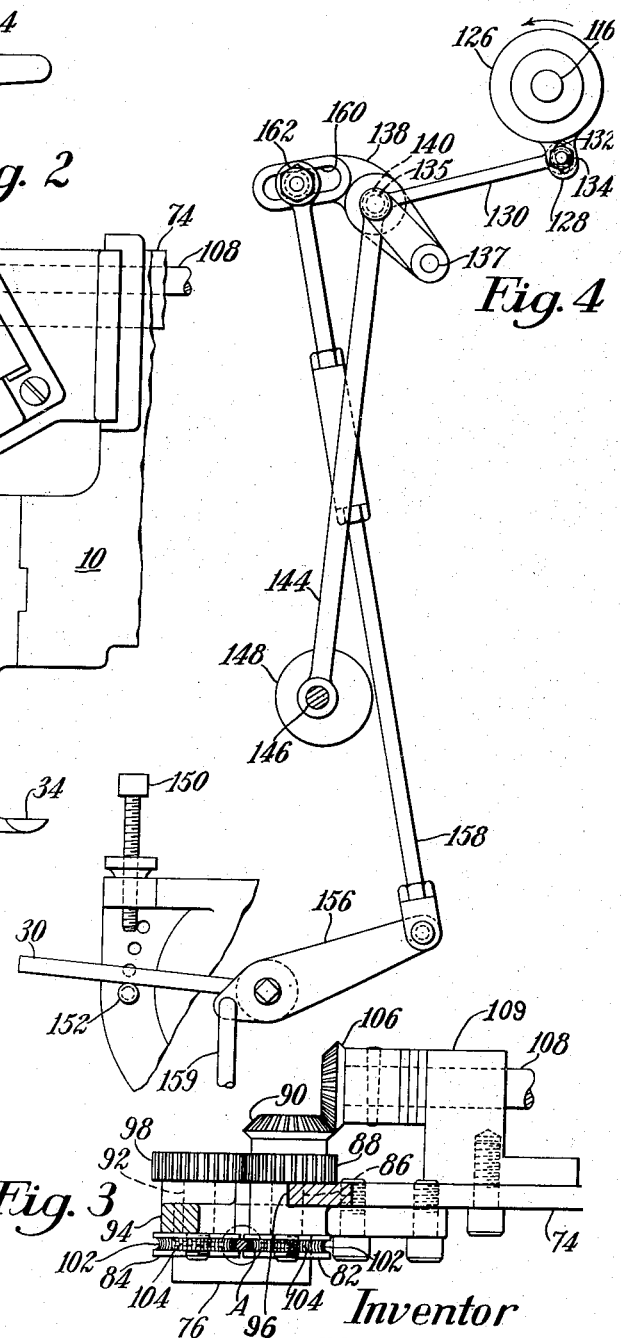

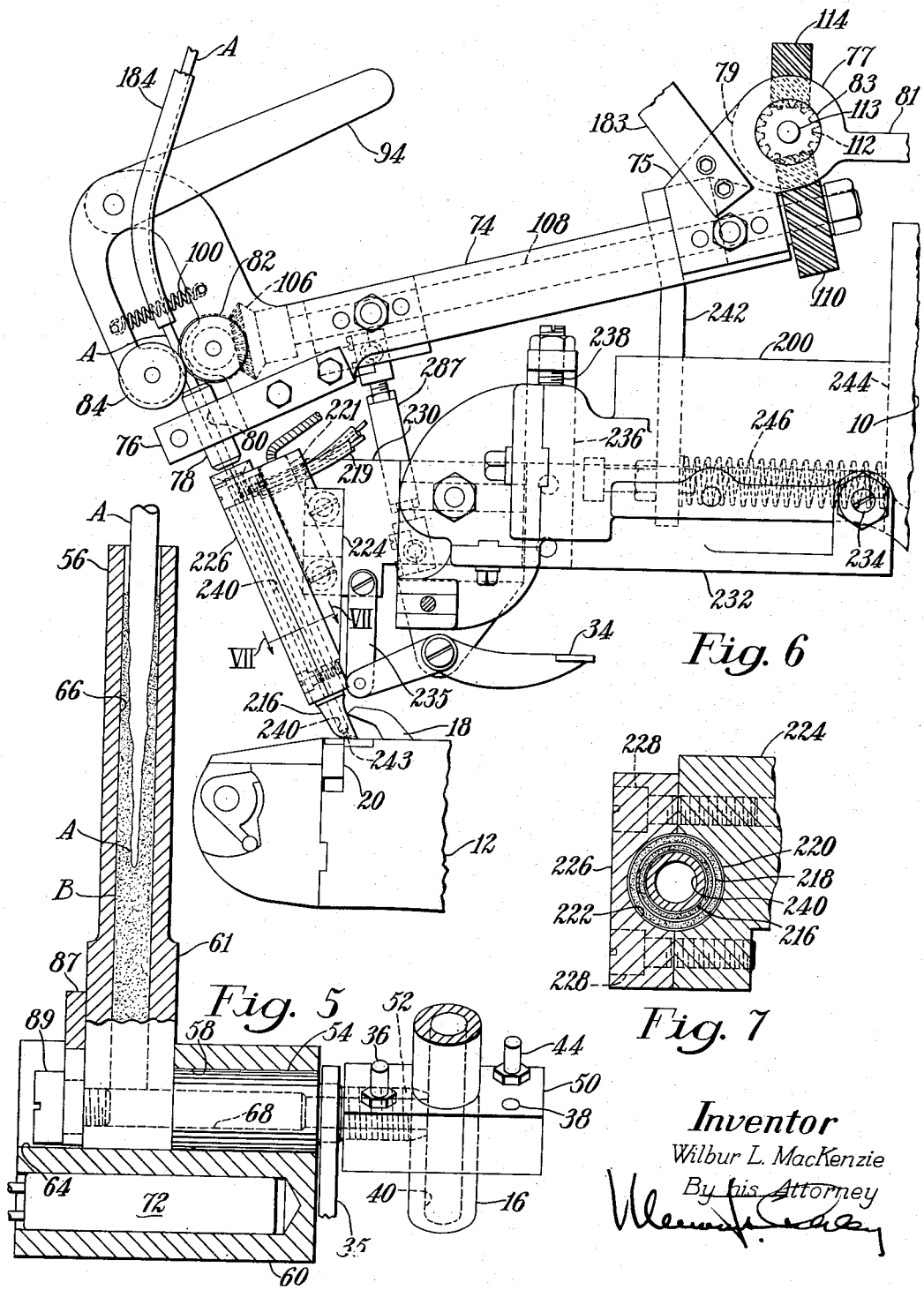

2,762,716
METHODS OF AND APPARATUS FOR DISPENSING AND APPLYING THERMOPLASTIC ADHESIVES

Wilbur L. MacKenzie, deceased, late of Beverly Mass., by Lawrence A. Ford, administrator, Beverly, Mass., assignor to United Shoe Machinery Corporation, Flemington, N. J., a corporation of New Jersey Continuation of application Serial No. 183,697, September 8, 1950. This application February 25, 1954, Serial No. 412,485

5 Claims. (Cl. 117—43)

This application is a continuation of an application for United States Letters Patent Serial No. 183,697, filed September 8, 1950, now abandoned, in the name of Wilbur L. MacKenzie. This invention relates to a novel method of and apparatus for dispensing and applying thermoplastic adhesive, herein illustrated, by way of an example, as embodied in a folding machine of the type disclosed in United States Letters Patent No. 2,301,202, issued on November 10, 1942 in the name of Paul H. Dixon. It is to be understood, however, that the novel method and apparatus of this invention are of broader utility and, therefore, not limited to the operation of folding or to embodiment in a machine of the exact construction shown in the aforementioned patent.

In a number of manufacturing operations, performed by certain existing machines, it has been hitherto proposed to apply thermoplastic adhesive, in a heated molten condition, to a part, or parts, being operated upon to form an adhesive bond as a result of pressure subsequently applied by operating elements of the machine. For example, in the folding machine disclosed in the patent referred to above, molten thermoplastic adhesive is pumped from a reservoir, in which it is heated, and extruded through one of the folding instrumentalities onto a work piece. A somewhat similar arrangement for dispensing thermoplastic adhesive in a lasting machine is shown in United States Letters Patent No. 2,476,290, issued on July 19, 1949 in the name of Joseph Fossa. Although these prior arrangements have proven to be generally satisfactory in use, the reservoirs in which the thermoplastic adhesive is heated and melted must be replenished from time to time by the operator who has to break the adhesive, which is solid at room temperature, out of the container in which it is received and place the broken pieces in the reservoir. This procedure not only consumes the operator's time but involves more or less waste and there is always the possibility that pieces of the adhesive retrieved from the floor of the factory will be contaminated with particles of dirt which may clog up some of the small passageways leading from the reservoir to the point where the adhesive is applied to the work.

Also, with these prior arrangements, it is necessary to heat up a rather large quantity of the adhesive in the reservoir so as to maintain an ample supply of molten adhesive at the point of discharge onto the work, during the operation of the machine. Because of the insulating character of thermoplastic adhesives, a considerable heating period is required to render the large quantity of adhesive in the reservoir molten enough to be handled by the adhesive pump. Accordingly, the heating element, or elements, must be turned on well in advance of the time when the machine is to be used and, in those instances where the machine is operated with frequent interruptions during a work period, the heat must be left on until all the work has been completed if delays are to be avoided. Such continued application of heat for long periods of time may, however, have a deleterious effect on the thermoplastic adhesive itself which, in many cases, is composed of chemical compounds that are more or less unstable at elevated temperatures and hence may be broken down when subjected to heat for long periods. Also, where the adhesive is heated in a reservoir, it is a rather difficult and time consuming job to clean out the reservoir when changing over from one kind of thermoplastic adhesive to another.

An object of this invention is to provide a novel method of dispensing and applying thermoplastic adhesive in molten condition which entirely avoids the difficulties mentioned above. To that end, it is proposed to dispense solid thermoplastic adhesive in the form of an elongated flexible rod, or strip, wound into a coil, by progressively unwinding the rod from the coil and feeding the rod adhesive through a passageway, applying heat to the adhesive within the passageway in such a manner that successive portions of the solid rod, or strip, of adhesive are rendered molten and flowable, conducting the molten adhesive from the passageway to a work engaging member and there applying it directly to a work piece as the latter is moved relatively to the work engaging member. More particularly, the thermoplastic adhesive, which may be any suitable composition, is formed in the shape of a continuous flexible rod, or strip, of any desired cross-sectional shape, herein illustrated as circular, and then wound onto suitable spools, or reels, for ease of transportation, handling and storage. In use, in accordance with the herein illustrated embodiment of the novel method of this invention, the rod of adhesive is drawn off the reel and pushed through an open-ended passageway of substantially the same size and shape as the rod, formed in a heated extrusion member, by means of suitable feeding mechanism. Heat is applied to the rod of adhesive within the passageway of the extrusion member in such a manner that a portion of the rod extending up from the discharge end of the passageway is wholly melted, while the remaining portion of the rod, extending down from the inlet end of the passageway, remains solid to act as a piston for forcing the molten adhesive out through the discharge end of the passageway and to a work engaging member where it is applied to the moving work piece. In order that the adhesive will be applied to the work piece as a band of substantially uniform thickness when the rate of movement of the work piece is changed, for example, to accommodate different working conditions, the rate of feed of the rod adhesive through the passageway is varied in accordance with such changes in the rate of movement of the work piece.

As will be apparent, when this method of dispensing thermoplastic adhesive is followed, only a relatively small quantity of adhesive in the passageway of the extrusion member is subjected to heat and melted, at any one time. Hence, although an ample supply of molten adhesive is almost immediately available, after heat has been applied, only as much of the adhesive supply as is fed through the extrusion member is subjected to heat and melted. Thus, not only are the delays previously involved in heating up a large quantity of adhesive eliminated but the danger of breaking down the adhesive, by the continued application of heat, is avoided. Also, the rod of adhesive wound on its reel, or spool, will keep clean and the operator is spared the trouble of breaking adhesive out of a shipping container. Moreover, it becomes a relatively simple matter to change over from one particular kind of thermoplastic adhesive to another. In addition to the advantages outlined above, this novel method of dispensing thermoplastic adhesive also affords a very effective, yet flexible, manner of regulating the rate at which the molten adhesive is delivered. Thus, the rate of delivery of adhesive may be varied either by using a larger or smaller rod, or strip, of adhesive or by increasing, or decreasing, the speed at which the rod, or strip, is fed through the heated extrusion member.

Another object of this invention resides in the provision of a novel and improved apparatus for dispensing and applying heated thermoplastic adhesive in accordance with the method just described. With this purpose in view, the herein illustrated apparatus comprises a device for storing a quantity of solid thermoplastic adhesive formed in the shape of an elongated flexible rod and wound into a coil, a member formed with a passageway having an inlet end and a discharge end, mechanism for progressively withdrawing the rod of adhesive from the coil and for feeding the rod adhesive through the passageway, means for applying heat to the adhesive within the passageway so as to render successive portions of the solid rod of adhesive molten and flowable along a portion of the passageway adjacent to the discharge end of the passageway, and a work engaging member for conducting the molten adhesive from the discharge end of the passageway and applying it to a work piece. More particularly, the apparatus herein illustrated includes means for supporting a reel, or spool, on which the flexible rod, or strip, of solid thermoplastic adhesive is stored, an extrusion member, formed of metal or other heat-conducting material and having an open-ended passageway extending therethrough, suitable means for heating the extrusion member, and a pair of feed rolls arranged to draw the rod, or strip, of adhesive from the storage reel, or spool, and to feed it into the passageway in the heated extrusion member. With this particular arrangement, the molten adhesive is forced out of the discharge end of the passageway and to the work engaging member by the solid portion of the rod as it is fed into the inlet end of the passageway.

This novel adhesive-dispensing apparatus is herein illustrated, by way of an example, as applied to a folding machine of the type shown in the aforementioned patent to Dixon. Thus, the feed rolls are conveniently arranged to be rotated by mechanism driven from the main drive shaft of this folding machine, while the heated extrusion member is suitably mounted so as to deliver heated molten adhesive into an adhesive-conducting passageway formed in the heated creaser foot of the machine. Alternatively, the extrusion member may be formed as a part of the creaser foot. Also, suitable means are provided for supporting an adhesive storage reel, or spool, and for guiding the rod of adhesive to the feed rolls, as it is drawn from the reel, or spool. The folding machine to which this adhesive-dispensing apparatus is shown as applied, is provided with folding instrumentalities including a hammer and an anvil that are operated from the main drive shaft of the machine to effect a step-by-step feeding of the work piece and, in order to facilitate the folding operation, this machine has mechanism, under the control of an operator, for varying the rate at which the work piece is fed along. Preferably, and with the view of assuring that the molten thermoplastic adhesive will be applied to the work piece as a band of substantially uniform thickness, the mechanism for driving the feed rolls is arranged to rotate these rolls intermittently, in predetermined time relation to the feeding action of the hammer and anvil, and is adapted to vary the delivery of the adhesive in accordance with changes in the rate of feed of the work piece.

The above and other objects and features of the invention will appear in the following detailed description of the embodiment illustrated in the accompanying drawings, and will be pointed out in the claims.

In the drawings,

Fig. 1 is a view in side elevation showing one embodiment of the invention as applied to a folding machine;

Fig. 2 is a view in side elevation showing a portion of the machine illustrated in Fig. 1 at an enlarged scale;

Fig. 3 is a plan view of a part of the machine showing the rod feed mechanism;

Fig. 4 is a diagrammatic view showing operating mechanism forming a part of the machine;

Fig. 5 is a view of a portion of the machine with certain parts in vertical section and others broken away to simplify the disclosure;

Fig. 6 is a view corresponding to Fig. 2 but showing a modified construction; and Fig. 7 is a view in section, substantially on line VII—VIII of Fig. 6.

Referring to these drawings, and particularly Figs. 1 and 2 thereof, the folding machine which is therein illustrated is, except as noted below, similar to the machine disclosed in detail in the aforementioned patent to Dixon. Thus, this machine has a frame comprising upper and lower members 10 and 12 which are of the shape shown in Fig. 1 and adapted to be mounted on a bench 13, or other similar support. The operating instrumentalities of the folding machine include a folding finger 14 which folds the margin of the work piece against a creaser foot 16, a hammer 18, and anvil, not shown, which operate to press the folded margin against the body of the work piece, and also to feed the work along intermittently. During the operation of the folding finger, the work piece is clamped against the lower end of the creaser foot by means of a gripping member 20, which has a portion extending beneath the creaser foot, and the work is guided by means of a guide finger 22.

The folding finger, hammer and anvil and the gripping member are operated by mechanism, contained within the lower frame member 12, which is driven by means of a main drive shaft 24, pulley 26 and belt 28. As is explained in the Dixon patent, this mechanism includes elements, controlled by an arm 30, Figs. 1 and 4, for varying the extent of the feeding increments imparted to the work piece by the hammer and anvil. The upper frame member carries a bracket 32 in which the creaser foot 16 is mounted for sliding movement upwardly in the bracket 32 and a finger lever 34, connected to the creaser foot by means of a link 35, see Fig. 5, is provided for elevating the creaser foot. The creaser foot 16 is provided with a passageway 40 through which heated thermoplastic adhesive is fed and applied to a portion of the work piece during the operation of the machine, Fig. 1. The exact construction of the creaser foot shown in the drawings is, however, the same as that disclosed in United States Letters Patent No. 2,347,674, issued May 2, 1944 in the name of H. E. Dow et al., to which reference may be made for details not shown herein. In accordance with the disclosure of this last-mentioned patent, the passageway 40 in the creaser foot contains a valve rod 42 which is adapted, when rotated, to open or close an orifice 43 in the lower end of the creaser foot, thereby controlling the flow of adhesive therethrough. For thus rotating the valve rod, it is provided with a gear 45 which meshes with a gear quadrant 47 and this gear quadrant is connected to the armature 49 of a solenoid 46 by means of a link 48, Fig. 2.

For delivering heated molten thermoplastic adhesive to the passageway 40 of the creaser foot 16 and for forcing the adhesive through this passageway and onto a work piece, when the valve rod 42 is rotated to a position to open the orifice 43 in the creaser foot, the following arrangement is provided. A plate member 50 is secured to the upper part of the creaser foot by the threaded portion 52 of a lateral projection 54 formed on a vertically disposed member 56, Fig. 5. This lateral projection is cylindrical in shape and fits in a cylindrical hole 58 drilled through a block 60. Between this block and the plate 50, this projection is formed with a shoulder 62 on which the upper end of the link 35, which is connected at its lower end to the finger lever 34, is mounted. As in the machine of Dow et al., the plate 50 carries a pair of pins 36 and 38 which cooperate with the upper end of the bracket 32 to prevent rotation of the creaser foot and a stop screw 44 to limit downward movement of the creaser foot in the bracket 32, Fig. 5. The lower part 61 of the vertically disposed member 56 is rectangular in cross section and fits into a correspondingly shaped recess 64, formed in the block 60, Fig. 5. The vertically disposed member 56 is provided with a passageway in the form of a bore 66 that intersects a bore 68, formed in the lateral projection 54 and extending therethrough to the passageway 40 in the creaser foot. The block 60, member 56 and its lateral projection 54 are all made of heat-conducting metal and the block 60 has a bore 70 in which a well-known type of electrical heating unit 72 is located.

Pivotally mounted for vertical movement on the upper part of the frame member 10, in a manner explained below, is an arm 74, Figs. 1 and 2, and secured to this arm is a block 76 in which there is mounted a guide bushing 78, formed of ceramic or similar heat-insulating material, Fig. 2. This bushing is provided with a bore 80 which is substantially in alinement with the bore 66 in the member 56 and also with the "bite" of a pair of feed rolls 82, 84 carried by the arm 74 and is spaced from the member 56 to leave an air gap therebetween. The roll 82 is secured to a shaft 86, journaled adjacent to the end of the arm 74, and this shaft carries a spur gear 88 and a bevel gear 90, Fig. 3. The roll 84 is secured to a shaft 92 that is journaled in an L-shaped arm 94, pivotally mounted on an upstanding portion 96 of the arm 74, Fig. 2. The shaft 92 carries a spur gear 98 which meshes with the gear 88 and a coil spring 100 is arranged to hold the parts yieldingly in the positions shown in Fig. 2 and with the rolls 82, 84 in gripping engagement with a rod of adhesive, indicated by the reference character A. As shown in Fig. 3, the rolls 82 and 84 are formed with grooved peripheries 102 which are provided with serrations 104 to enhance their grip on the rod of adhesive. The arm 74, which carries the feed rolls 82 and 84, is connected to the member 56, so as to partake of upward movements imparted to the creaser foot 16 by the flinger lever 34, by means of a link 87, which extends downwardly from the block 76, Fig. 2, and is secured to the member 56 by means of a screw 89, Fig. 5.

The bevel gear 90 meshes with another bevel gear 106 that is secured to one end of a shaft 108, journaled in a bracket 109 on the arm 74, Figs. 2 and 3. Secured to the other end of the shaft 108 is a worm wheel 110 which meshes with a worm 112, journaled to rotate on a shaft 113, Fig. 1. This worm meshes with a second worm wheel 114 that is secured to one end of a shaft 116. This shaft is journaled, adjacent to its opposite ends, in bearing bosses 118 and 120, formed in a bracket member 122 which is mounted on the upper frame member 10. The arm 74 is secured to a bracket member 75 which has a pair of spaced ears, one of which is indicated by the reference character 77 in Figs. 1 and 6, and these ears are received between similar spaced ears, one of which is indicated by the reference character 79, carried by a bracket member 81 that is secured to the upper part of the frame member 10, see Fig. 1. These ears are bored to receive bushings 83, one of which appears in Figs. 1 and 6 in which the shaft 113 is journaled. This arrangement permits the pivotal movement of the arm 74 about the axis of the shaft 113, when the creaser foot 16 is elevated by means of the finger lever 34, without disengagement of the worm 112 and worm wheels 110 and 114. Associated with the shaft 116 are a pair of one-way clutch devices 124 and 126 of conventional construction. One of the elements of the clutch 124 is connected to the shaft 116 and the other to the boss 120, while one element of the clutch 126 is connected to the shaft 116 and the other to an arm 128. These clutch elements are so arranged that the shaft 116 will be rotated intermittently, and in the direction of the arrow, Fig. 4, when the arm 128 is moved in one direction, and held against reverse rotation, by the clutch 124, when the arm 128 is moved in the opposite direction.

The arm 128 is oscillated, to effect intermittent rotation of the shaft 116 and hence of the feed rolls 82, 84, in the direction of the arrows, Fig. 2, in the following manner. A link 130 which is adjustably connected at one end to the arm 128, by means of a slot 132 and clamp screw 134, Fig. 4, is pivotally connected to a pin 135, carried by a U-shaped arm 136, Fig. 1. This U-shaped arm is pivoted on a stud 137, mounted on one end of a lever 138, Figs. 1 and 4, that is pinned to a shaft 140, journaled in a bearing boss 142 formed on the bracket member 122, Fig. 1. Also pivotally connected to the pin 135 on this U-shaped lever is a link 144 which extends upwardly from a crank pin 146, carried by a disk 148 that is secured to the outer end of the main drive shaft 24 of the folding machine. With this arrangement, when the folding machine is running, the shaft 116 and feed rolls 82, 84 will be rotated intermittently and in predetermined time relation to the actions of the folding instrumentalities, by the action of crank pin 146, U-shaped lever 136, arm 128 and one-way clutches 126, 124, and the crank pin 146 is so disposed, angularly, that the feed rolls are rotated during the feeding action of the hammer and anvil and held stationary during the operation of the folding finger.

As has been pointed out above, the folding machine herein illustrated is provided with mechanism for varying the length of the feeding increments imparted to the work piece, by the hammer and anvil, which is controlled by the arm 30, Fig. 4. In order that the angular movements of the feed rolls 82, 84, during each intermittent rotation thereof, may be increased or decreased when the feeding increments are increased or decreased, the following mechanism is provided. The arm 30 is arranged to be rotated through a limited angle, as determined by a stop screw 150 and a pin 152 which may be inserted in any one of several holes 154 formed in the machine frame member 10, Fig. 4. The mechanism for varying the feeding action of the machine is so constructed that, when the arm 30 is moved upwardly, from the position in which it is shown in Fig. 4, the amount of feed is decreased. The arm 30 is connected to a lever 156 which is pivotally mounted on the frame member 12 and secured to this lever is one end of a link 158. The other end of this link is adjustably connected, by means of a slot 160 and a clamp screw 162, to the lever 138 which has been referred to above. With this arrangement, when the arm 30 is swung upwardly and in a clockwise direction, Fig. 4, the U-shaped arm 136 will be rotated about the axis of shaft 140, Fig. 4, in a counterclockwise direction, to a position more nearly in line with the link 130. Now the reciprocating link 144 will produce oscillating movements of the U-shaped lever and reciprocating movements of the arm 128, of lesser angular extent thereby decreasing the intermittent rotary movements of the feed rolls 82, 84. The adjustable connection of link 158 to the lever 138 and the adjustable connection of the link 130 to the arm 128 are provided for the purpose of making small relative adjustments between the feeding action of the machine and the rotary movements of the feed rolls. The arm 30 is connected to a foot treadle, not shown, by means of a link 159, Fig. 4, and pinned to the shaft 140 is a pointer 161, located adjacent to a graduated plate 163 mounted on the boss 142, Fig. 1. Thus the operator can vary the feed rate by means of his foot and is provided with a visual indication of the position of the arm 30.

As suggested above, and in accordance with the novel method of this invention, the thermoplastic adhesive is formed, for example, by extrusion, in the shape of an elongated rod, or strip, A of considerable length. Preferably, and as shown in Fig. 3, this rod is circular in cross section. The thermoplastic adhesive used must be of a composition that is solid at room temperature and at the same time sufficiently flexible to be wound on, and drawn from, a spool, or reel, R, Fig. 1. It will be understood, of course, that this invention is not limited to the use of a particular thermoplastic adhesive but, instead, embraces any such composition having the aforementioned physical characteristics. In this connection, it may be pointed out, by way of an example, that one adhesive which has been used with satisfactory results comprised a solid solution of high molecular weight polymers of styrene in a mixture of low molecular weight polymers and copolymers of styrene, substituted styrene and styrene homologs.

The spool, or reel, R may be made of any suitable material, for example, cardboard, and comprises a pair of side flanges 172, 174 connected to a hub member 176. These side flanges are provided with central bores to receive a supporting shaft 178 which is adapted to be fitted in the slotted upper ends 180 of a bifurcated supporting bracket 182. The rod of adhesive A is led from the reel R, through a trough 184, having side walls 186, 188, and a bottom wall 190, Fig. 2, and supported on the arm 74 by a post 183, between the feed rolls 82, 84, through the bore 80 in the guide bushing 78 and into the upper end of the bore 66 in the member 56, the rolls 82, 84 being separated, by the depression of the arm 94, to facilitate this threading of the rod A through the bushing 78 and into the member 56. A coil spring 185, stretched between the bracket 182 and the post 183, is adapted to counterbalance a portion of the weight of arm 74 and parts carried thereby, when the creaser foot 16 is elevated by the finger lever 34. As has already been described, the block 60 in which the lower part of the member 56 is fitted, is heated by means of an electrical unit 72, and the creaser foot 16 is heated, throughout its entire length, by means of a second electrical unit 192, mounted in the bracket 32, as taught in the patent to Dow et al., referred to above. These two electrical heating units are connected to a source of electrical energy and are controlled by suitable thermostats, not shown, in a well-known manner.

When the folding machine is being operated, heated molten adhesive will be supplied to the creaser foot 16 and extruded therefrom onto the work piece in the following manner. The block 60 and the member 56, which functions more or less like an extrusion member, and the lateral projection 54 are heated by the unit 72 while the creaser foot 16 is heated throughout the entire length of its passageway 40, by means of the unit 192. The feed rolls 82, 84 draw the rod of adhesive from the reel R and force it through the bushing 78 and into the upper, or inlet end, of the bore 66 formed in the member 56, as they are intermittently rotated in predetermined time relation to the action of the folding instrumentalities, in the manner described above. As the rod of adhesive A is thus fed into the bore 66, it will be melted and rendered flowable at some point below the upper, or inlet, end of the bore and above the discharge end thereof, where this bore intersects the bore 68 of the lateral projection 54. It will be understood, of course, that the heat which is applied to the member 56 adjacent to its lower end, by means of the heating unit 72, will be conducted up to the upper end of this member. However, because of the loss of heat through radiation, the temperature at the upper end of the bore 66 will be somewhat lower than that which exists at the lower end of this bore. Thus, as the rod of adhesive is fed into the bore 66 it will begin to melt on its outer surface and this melting action will increase progressively along the bore 66 until the rod is fully melted as indicated by reference character B in Fig. 5. Preferably, the heat is so applied by means of the heating unit 72 that melting of the outer surface of the rod begins shortly after the rod is fed into the upper end of the bore 66 and the rod is fully melted at some point above the discharge end of this bore in the manner illustrated diagrammatically in Fig. 5, when the rod of adhesive is being fed into the upper, or inlet, end of the bore by the feed rolls 82, 84.

As the outer surface of the rod of adhesive begins to melt, this quantity of molten adhesive will fill any space between the rod and the inside of the bore 66 and serve both as a lubricant and a seal. Thus, the solid part of the rod, as it is fed into the bore 66, will act as a piston and force the molten adhesive out of this bore, through the bore 68 in the lateral projection 54, into the passageway 40 in the creaser foot 16 and out of the discharge orifice 43 at the lower end thereof onto the work piece, it being understood that the solenoid 46 will have been energized to operate the valve rod 42 and open this orifice before, or at the same time, the machine was started. As the molten adhesive is thus forced through the bore 68 and the passageway 40, its temperature is preferably still further increased by the heating action of the unit 72, which is located closely adjacent to the lateral projection 54, and the unit 192 in the bracket 32. Such increase in the temperature of the adhesive is desirable in order to offset the tendency of the molten adhesive to cool unduly as it passes through the relatively small lower end of the creaser foot.

As stated above, the rod of adhesive A is of substantially the same shape and size as the bore 66 in the extrusion member 56. Preferably, however, while this rod of adhesive is of exactly the same cross-sectional shape as the bore 66, it is made with a slightly smaller diameter than that of the bore in order to avoid any tendency of the unmelted and solid part of the rod to stick as it is fed into the upper, or inlet, end of the bore. Accordingly, the expression "of substantially the same shape and size" is used herein, and also in the claims, with a somewhat broadened meaning and is intended to embrace conditions where the rod of adhesive is appreciably smaller than the bore in the heated extrusion member through which it is fed as illustrated diagrammatically in Fig. 5. When the machine is stopped, the feed rolls 82, 84 cease rotating and movement of the rod of adhesive through the bore 66 is arrested. Hence, the delivery of adhesive through the discharge orifice of the creaser foot is terminated and the valve rod 42 will be operated, by deenergizing the solenoid 46, to close this orifice.

As pointed out above, the feed rolls 82, 84 are rotated intermittently and in such predetermined time relation to the action of the folding instrumentailities that they rotate when the work piece is being fed along by the hammer and anvil and are stopped while the folding finger is operating and the work piece held stationary by the creaser foot and gripper member. Also, the amount of rotation imparted to the feed rolls, during each feeding action of the hammer and anvil, is varied as the rate of feed is changed by the arm 30, during the operation of the machine, through the action of the lever 156, link 158, and lever 138. Therefore, the adhesive will be applied to the work piece at a predetermined rate and as a band of uniform thickness and width. As will be apparent, the quantity of adhesive applied per linear unit along the work piece may be increased or decreased by increasing or decreasing the size of the feed rolls, or by changing the speed ratio of the mechanism for driving these rolls. In this connection, the speed ratio of the herein illustrated drive mechanism may be varied, to a somewhat limited extent, by adjusting the link 130 along the arm 128, by means of the slot 132 and clamp screw 134. The amount of adhesive delivered from the extrusion member 56 may also, of course, be varied by changing the size and shape of the bore 66 therein and the cross-sectional shape and size of the adhesive rod.

When thermoplastic adhesive is dispensed in the foregoing manner, the elongated rod of adhesive is conveniently transported, handled, and stored on the reels, or spools, R which are easily loaded into a machine merely by slipping the shaft 178 through the reel and mounting the reel on a supporting member such, for example, as the bracket 182. Inasmuch as the adhesive need not be broken out of a can, or similar container, a considerable amount of the operator's time is saved and there is no chance that the adhesive will become contaminated with dirt particles which might clog up small passageways of the apparatus. During use, only the relatively small quantity of adhesive which is in the lower part of the bore 66, in the bore 68 and in the passageway 40 of the creaser foot 16, is heated and melted, at any time. Hence, a supply of molten adhesive will be available in a very short time after heat has been applied and the delays previously involved in heating up and melting large quantities of adhesive are avoided. Also, since but a small quantity of adhesive which is immediately thereafter extruded onto the work piece, is heated up and melted at any one time, there is no likelihood that the adhesive will be broken down or damaged by the continued application of heat thereto.

When the supply of the rod of adhesive on a reel R has been exhausted, this empty reel is removed and a full reel placed on the shaft 178. The free end of the rod of adhesive on this new reel is then introduced between the feed rolls 82 and 84 and brought against the trailing end of the previous rod which will, of course, be located adjacent to the "bite" of these rolls. Now, when the machine is again started, the new rod of adhesive will push the remaining part of the previous rod down through the guide bushing 78 and into the bore 66 of the member 56. Thus, every bit of each succeeding rod of adhesive can be used and applied to a work piece, thereby, wholly eliminating waste. Similary, it is a very simple matter to change over from one kind of adhesive to another. To accomplish such a change, the feed rolls 82, 84 are first separated and the rod of adhesive broken off, preferably just below the bushing 78. The reel of adhesive is now replaced by a reel of the desired kind of adhesive is now replaced by a reel of the desired kind of adhesive and the end of this new rod of adhesive between the feed rolls and abutted against the end of the previous rod, as explained above. After the machine is again started, the supply of molten adhesive of the new kind will soon become available at the discharge orifice of the creaser-foot 16.

While in the preferred embodiment of the invention the adhesive is formed in the shape of a rod of circular cross section and the heated extrusion member provided with a bore of the same cross-sectional shape, it will be understood, of course, that the invention is not limited to the use of such shapes. In fact, under certain circumstances it may be desired to use an elongated piece of adhesive of noncircular cross section. For example, if the conditions are such that a circular rod of adhesive of relatively large diameter is required to provide the desired rate of delivery of molten adhesive, it may be quite difficult, because of the insulating character of the thermoplastic adhesive, to render the adhesive molten and flowable before it reaches the discharge end of the bore in the heated extrusion member. Such difficulty may, however, be easily avoided if the adhesive is formed in the shape of an elongated strip of rectangular cross section and relatively thin in comparison to its width. Such a thin strip may be readily melted and rendered flowable as it is fed through a correspondingly shaped passageway formed in the heated extrusion member. Accordingly, in the foregoing description and also in the following claims, except where otherwise limited, the terms rod and strip are use more or less synonymously and are intended to embrace any elongated piece of adhesive regardless of its exact cross-sectional shape.

It will be observed in Fig. 5 that the molten adhesive, indicated by the reference character B, must be forced around two right angled bends, one where the passageway 66 opens into the bore 68 and another where the bore 68 is connected to the passageway 40 in the creaser foot 16. With some kinds of thermoplastic adhesive it is somewhat difficult for the solid portion of the adhesive A to force the molten adhesive B along such a tortuous path. To avoid such difficulty, the modified arrangement shown in Fig. 6 of the drawings may be used. In this figure parts similar to those of the embodiment illustrated in Figs. 1 and 5 of the drawings are identified with the same reference characters. For this modified arrangement, a portion of the frame member 12 has been cut away at 200 to permit relocation of the bracket member 81 in such a position that the "bite" of the feed rolls 82, 84 and also the bore 80 of the bushing 78 are in alinement with the passageway 240 of a modified creaser foot 216. The upper part of this creaser foot, which is surrounded by insulating material in which there is embedded a heating coil 218, is received in complemental recesses 220, 222, formed respectively in a metal block 224 and a cover member 226 which is secured to the block by screws 228, Fig. 7. The block 224, in turn, is secured to an insulating member 230 which is mounted on the outer end of an arm 232 that is pivotally supported on the frame member 10 by means of pivot screws, one of which is shown at 234 in Fig. 6.

The arm 232 is connected to the arm 74 by means of a link 287 and to the finger lever 34 by means of a second link 235. This arm carries a bracket member 236 in which there is mounted an adjustable stop screw 238 that is adapted to engage a portion of the frame member 10 and thus limit downward movement of the arms 232 and 74, and hence of the creaser-foot 16. Secured to the bracket member 75 is a downwardly extending member 242 and interposed between the lower end of this member and a surface 244 on the frame member 10 is a compression spring 246 which functions, like the spring 183, to counterbalance a portion of the weight of the arms 74 and 232, together with the parts carried by these arms, when the presser foot 216 is elevated by the finger lever 34.

The passageway 240 in the creaser foot terminates at its lower end in an orifice 243 through which the molten adhesive is extruded onto the work. The heating coil 218, which extends substantially throughout the entire length of the creaser foot, is connected to a suitable source of electrical energy, not shown, by means of leads 219 and is under the control of a thermostat 221. Preferably, this heating coil is so arranged, as by winding its coils closer together, that its heating effect increases downwardly from the upper end of the creaser foot, to insure that the molten adhesive will be delivered to the smaller portion of the creaser foot adjacent to its lower end at a sufficiently high temperature to prevent it from solidifying before it is extruded onto the work.

In general, this modified arrangement which is illustrated in Fig. 6 operates in exactly the same manner as the embodiment shown in Figs. 1 to 5. Thus, the rod of adhesive A as it is fed into the inlet or upper end of the passageway 240 in the creaser foot 216 will be progressively melted, in the manner illustrated diagrammatically in Fig. 5, and the molten adhesive B will be forced out of the discharge end of this passageway and through the orifice 243 by the remaining solid portion of the rod of adhesive as it is fed into the inlet end of this passageway. However, with this modified arrangement, in which the upper part of the creaser foot functions as an extrusion member, the adhesive travels along a substantially straight line path as it is fed along by the feed rolls 82, 84 through the bushing 78 and downwardly through the passageway 240 and orifice 243 in the creaser foot 216.

Having thus described my invention, what I claim as new and desire to secure by Letters Patent of the United States is:

1. A method of dispensing and applying thermoplastic adhesive which comprises providing an elongated rod of solid thermoplastic adhesive wound into a coil, progressively unwinding the rod from the coil and feeding the rod adhesive through a passageway, applying heat to the adhesive within the passageway to render successive portions of the solid rod of adhesive molten and flowable, conducting the molten adhesive from the passageway to a work engaging member, moving a work piece relatively to said work engaging member at a variably predetermined rate, and varying the rate of feed of the rod adhesive through said passageway in accordance with variations in the rate of movement of the work piece relatively to said work engaging member to cause molten adhesive to be applied to the moving work piece by the work engaging member as a band of substantially uniform thickness.

2. Apparatus for dispensing and applying heated thermoplastic adhesive comprising, in combination, a work engaging member for conducting and applying heated adhesive to a work piece, mechanism for moving a work piece relatively to said work engaging member at a predetermined rate, means for controlling the operation of said mechanism to vary the rate of movement of the work piece, a device for storing a quantity of solid thermoplastic adhesive formed in the shape of an elongated rod and wound into a coil, a member provided with a passageway having an inlet end and a discharge end connected to said work engaging member, means for progressively withdrawing the rod of adhesive from said coil and for feeding the rod adhesive through said passageway, means associated with said member provided with the passageway for applying heat to the rod of adhesive within the passageway to render successive portions of the solid rod of adhesive molten and flowable along a portion of the passageway adjacent to its discharge end so that molten adhesive is fed out of the discharge end of the passageway and is conducted and applied to the work piece by said work engaging member, and means responsive to said aforementioned controlling means for varying the rate at which the rod of adhesive is withdrawn from the coil and is fed through the passageway in accordance with variations in the rate of movement of the work piece relatively to the work engaging member to cause the molten adhesive to be applied to the moving work piece as a band of substantially uniform thickness regardless of variations in the rate of movement of the work piece relatively to the work engaging member.

3. Apparatus for dispensing and applying heated thermoplastic adhesive comprising, in combination, a work engaging member for conducting and applying heated adhesive to a work piece, mechanism for moving a work piece relatively to said work engaging member at a predetermined rate, means for controlling the operation of said mechanism to vary the rate of movement of the work piece, a member provided with a passageway having an inlet end and a discharge end connected to said work engaging member, means for progressively feeding a quantity of solid thermoplastic adhesive formed in the shape of an elongated rod through said passageway, means associated with said member provided with a passageway for applying heat to the rod of adhesive within the passageway to render successive portions of the solid rod of adhesive molten and flowable along a portion of the passageway adjacent to its discharge end so that molten adhesive is fed out of the discharge end of the passageway and is conducted and applied to the work piece by said work engaging member, and means responsive to said aforementioned controlling means for varying the rate at which the rod adhesive is fed through the passageway in accordance with variations in the rate of movement of the work piece relatively to the work engaging member to cause the molten adhesive to be applied to the moving work piece as a band of substantially uniform thickness regardless of variations in the rate of movement of the work piece relatively to the work engaging member.

4. Apparatus for dispensing and applying heated thermoplastic adhesive comprising, in combination, a work engaging member for conducting and applying heated adhesive to a work piece, mechanism for moving a work piece relatively to said work engaging member at a predetermined rate, means for controlling the operation of said mechanism to vary the rate of movement of the work piece, a device for storing a quantity of solid thermoplastic adhesive formed in the shape of an elongated rod and wound into a coil, a member provided with a passageway having an inlet end and a discharge end connected to said work engaging member, means for progressively withdrawing the rod of adhesive from said coil and for feeding the rod adhesive through said passageway, means associated with said member provided with the passageway for applying heat to the rod of adhesive within the passageway to render successive portions of the solid rod of adhesive molten and flowable along a portion of the passageway adjacent to its discharge end so that molten adhesive is fed out of the discharge end of the passageway and is conducted and applied to the work piece by said work engaging member, and means for varying the rate at which the rod of adhesive is withdrawn from the coil and is fed through the passageway in accordance with variations in the rate of movement of the work piece relatively to the work engaging member to cause the molten adhesive to be applied to the moving work piece as a band of substantially uniform thickness regardless of variations in the rate of movement of the work piece relatively to the work engaging member.

5. Apparatus for dispensing and applying heated thermoplastic adhesive comprising, in combination, a work engaging member for conducting and applying heated adhesive to a work piece, mechanism for moving a work piece relatively to said work engaging member at a predetermined rate, means for controlling the operation of said mechanism to vary the rate of movement of the work piece, a member provided with a passageway having an inlet end and a discharge end connected to said work engaging member, means for progressively feeding a quantity of solid thermoplastic adhesive formed in the shape of an elongated rod through said passageway, means associated with said member provided with a passageway for applying heat to the rod of adhesive within the passageway to render successive portions of the solid rod of adhesive molten and flowable along a portion of the passageway adjacent to its discharge end so that molten adhesive is fed out of the discharge end of the passageway and is conducted and applied to the work piece by said work engaging member, and means for varying the rate at which the rod adhesive is fed through the passageway in accordance with variations in the rate of movement of the work piece relatively to the work engaging member to cause the molten adhesive to be applied to the moving work piece as a band of substantially unifom thickness regardless of variations in the rate of movement of the work piece relatively to the work engaging member.

References Cited in the file of this patent

UNITED STATES PATENTS

| | | |
|---|---|---|
| 2,046,199 | MacDonald | June 30, 1936 |
| 2,058,971 | Forton | Oct. 27, 1936 |
| 2,088,348 | Schulpmann | July 27, 1937 |
| 2,272,780 | Schweyer | Feb. 10, 1942 |
| 2,301,202 | Dixon | Nov. 10, 1942 |
| 2,347,674 | Dow et al. | May 2, 1944 |
| 2,437,263 | Manning | Mar. 9, 1948 |
| 2,544,661 | Fossa | Mar. 13, 1951 |
| 2,673,121 | Brennan | Mar. 23, 1954 |
| 2,708,278 | Kamborian | May 17, 1955 |

FOREIGN PATENTS

| | | |
|---|---|---|
| 2,634 | Great Britain | Nov. 30, 1895 |
| 106,386 | Germany | Aug. 6, 1896 |
| 385,857 | Great Britain | Jan. 5, 1933 |
| 568,640 | Great Britain | Apr. 13, 1945 |